US010045206B2

(12) United States Patent
Hania et al.

(10) Patent No.: US 10,045,206 B2
(45) Date of Patent: Aug. 7, 2018

(54) APPARATUS AND METHOD FOR PROBE DATA MANAGEMENT

(71) Applicant: TomTom Traffic B.V., Amsterdam (NL)

(72) Inventors: Simon Hania, The Hague (NL); Michael Joseph Dixon, Edinburgh (GB)

(73) Assignee: TOMTOM TRAFFIC B.V., Amsterdam (NL)

(*) Notice: Subject to any disclaimer, the term of this patent is extended or adjusted under 35 U.S.C. 154(b) by 0 days.

(21) Appl. No.: 15/111,489

(22) PCT Filed: Jan. 14, 2015

(86) PCT No.: PCT/EP2015/050600
§ 371 (c)(1),
(2) Date: Jul. 14, 2016

(87) PCT Pub. No.: WO2015/107084
PCT Pub. Date: Jul. 23, 2015

(65) Prior Publication Data
US 2016/0330615 A1    Nov. 10, 2016

(30) Foreign Application Priority Data
Jan. 14, 2014   (GB) .................................. 1400601.9

(51) Int. Cl.
*H04W 12/02*       (2009.01)
*H04W 4/029*       (2018.01)
(Continued)

(52) U.S. Cl.
CPC ...... *H04W 12/02* (2013.01); *G06F 17/30312* (2013.01); *G06F 21/6254* (2013.01); *H04L 63/0414* (2013.01); *H04W 4/029* (2018.02)

(58) Field of Classification Search
CPC .......... G06F 17/30312; G06F 21/6254; H04L 63/0414; H04W 12/02; H04W 4/028
See application file for complete search history.

(56) References Cited

U.S. PATENT DOCUMENTS 9,170,111 B2   10/2015   Boschker et al.
9,297,664 B2   3/2016    Hilbrandie et al.
(Continued)

FOREIGN PATENT DOCUMENTS

EP    2552133 A1    1/2013
WO    2009009392 A1 1/2009
(Continued)

OTHER PUBLICATIONS

"Location based data and map reports" www.tomtom.com/en_gb/safeguarding-your-data/ retrieved Jan. 15, 2014.
(Continued)

*Primary Examiner* — Frantz Bataille

(57) ABSTRACT

Embodiments of the present invention relate to methods and systems for probe data management that facilitate anonymity between a device providing probe data and the probe data. Some embodiments relate to the removal of an association between a device identifier and an assigned probe identifier if no position information is received from the probe device for a predetermined time period, e.g. between 10 and 20 minutes. Other embodiments relate to periodic extraction of probe objects from a data store, such that a probe object is stored for at most a predetermined time period, e.g. 24 hours, and the use of position information from probe objects having the same probe identifier to create a historic journey trace.

20 Claims, 4 Drawing Sheets

(51) Int. Cl.
*G06F 21/62* (2013.01)
*H04L 29/06* (2006.01)
*G06F 17/30* (2006.01)

(56) References Cited

U.S. PATENT DOCUMENTS

| | | | |
|---|---|---|---|
| 2004/0093289 A1 | 5/2004 | Bodin | |
| 2006/0069496 A1 | 3/2006 | Feldman et al. | |
| 2007/0225912 A1 | 9/2007 | Grush | |
| 2008/0136670 A1 | 6/2008 | Tengler et al. | |
| 2009/0016524 A1 | 1/2009 | Park et al. | |
| 2010/0323715 A1 | 12/2010 | Winters | |
| 2012/0170560 A1* | 7/2012 | Han | G01S 5/0284 370/338 |
| 2012/0226554 A1 | 9/2012 | Schmidt et al. | |
| 2013/0018578 A1* | 1/2013 | Matsuo | G09B 29/106 701/431 |
| 2013/0247117 A1* | 9/2013 | Yamada | G08C 17/02 725/93 |

FOREIGN PATENT DOCUMENTS

| | | |
|---|---|---|
| WO | 2009053405 A1 | 4/2009 |
| WO | 2012076040 A1 | 6/2012 |

OTHER PUBLICATIONS

Marco Gruteser et al: "Enhancing Location Privacy in Wireless LAN Through Disposable Interface Identifiers: A Quantitative Analysis" Mobile Networks and Applications, Kluwer Academic Publishers, BO, vol. 10, No. 3, Jun. 1, 2005 (Jun. 1, 2005), pp. 315-325, XP019213672, ISSN: 1572-8153, DOI:10.1007/SII036-005-6425-I.

Lee C-H et al: "Enhanced Privacy and Authentication for the Global System for Mobile Communications" Wireless Networks, ACM, 2 Penn Plaza, Suite 701—New York USA, vol. 5, No. 4, Aug. 1, 1999 (Aug. 1, 1999), pp. 231-243, XP000859588, ISSN: 1022-0038, DOI: 10.1023/A:I019103228471.

Partial International Search Report for International Application No. PCT/EP2015/050600 dated May 15, 2015.

International Search Report for International Application No. PCT/EP2015/050600 dated Sep. 16, 2015.

* cited by examiner

APPARATUS AND METHOD FOR PROBE DATA MANAGEMENT

CROSS-REFERENCE TO RELATED APPLICATIONS

The present application is a National Stage of International Application No. PCT/EP2015/050600, filed on Jan. 14, 2015, and designating the United States, which claims benefit to United Kingdom Patent Application 1400601.9 filed on Jan. 14, 2014. The entire content of these applications is incorporated herein by reference.

FIELD OF INVENTION

The present invention relates to methods and systems for probe data management, and specifically methods and systems that facilitate anonymity between a device providing probe data and the probe data.

BACKGROUND TO THE INVENTION

It is known to provide services and/or information based on so called "trip data" or "probe data". The probe data is indicative of a position of a corresponding probe device of which it is possible to determine the geographic position and to communicate information indicative of the position to a receiver computer system. An example probe device may be a navigation device for directing a user to a destination. Thus the position information "probes" a transport network and can be used to identify, for example, traffic congestion in the transport network and changes in the transport network, and to determine improved travel time estimates and/or expected speeds of travel between locations.

With such probe data received from probe devices, privacy concerns exist concerning the processing and storage of the probe data. Such privacy concerns may relate to whether it is possible to identify the current and/or historic location of a user from the probe data.

It is an object of embodiments of the invention to at least mitigate one or more of the problems of the prior art.

SUMMARY OF THE INVENTION

In accordance with a first aspect of the present invention there is provided a computer implemented method for probe data management, comprising:

receiving substantially real-time position information indicative of a geographical position of a probe device and device identification information identifying the probe device;

assigning probe identification information to the position information, the probe identification information identifying a source of the position information within a probe data management system; and temporarily storing an association between the device identification information and the assigned probe identification information, wherein the stored association between the device identification information and the probe identification information is removed if no position information is received from the probe device for a predetermined time period.

In embodiments, the method comprises, upon receipt of position information from a probe device, determining if there is a stored association between device identification information identifying the probe device and probe identification information. When a stored association is determined to exist, the method may comprise retrieving the stored probe identification information and assigning the retrieved probe identification information to the position information.

In embodiments, the association is stored in a data store accessible to a processing device arranged to receive the position information from the probe device.

The predetermined time period after which the association is removed if no position information is received from the probe device may be between 1 and 30 minutes, preferably between 10 and 20 minutes, and most preferably 15 minutes.

In embodiments, the method comprises generating a probe object comprising: the probe identification information; and the position information associated with the probe identification information, and communicating the probe object to one or more processing devices for further processing. In embodiments, the method comprises receiving a plurality of probe objects, and temporarily storing the probe objects in a data store. The probe objects may be periodically extracted from the data store, and the position information from probe objects having the same probe identification information used to create a historic journey trace for storage in a data store. It will be understood that the historic journey traces are stored in the data store without reference to the probe identification information used in their creation; thus the traces can be said to be anonymous.

As will be appreciated, in such embodiments, when a probe object is extracted from the data store it is preferably deleted from the data store. Accordingly, a probe object is preferably stored in the data store for at most a predetermined time period, preferably between 12 and 48 hours, and most preferably for 24 hours. The predetermined time period for which the probe object is at most stored is therefore preferably greater, and typically substantially greater, than the predetermined time period after which the association between the device identification information and the probe identification information is removed if no position information is received from the probe device.

It is believed that the periodic extraction of probe objects to create historic journey traces may be new and advantageous in its own right. Thus, according to a further aspect of the invention there is provided a computer implemented method for probe data management, comprising:

receiving a plurality of probe objects, each probe object comprising substantially real-time position information indicative of a geographical position of a probe device and probe identification information identifying a source of the position information within a probe data management system; and temporarily storing the received probe objects in a data store, the method further comprising:

periodically extracting probe objects from the data store; and using the position information from probe objects having the same probe identification information to create a historic journey trace.

The present invention in this further aspect may include any or all of the features described in relation to the first aspect of the invention to the extent that they are not mutually inconsistent.

The present invention extends to a system for carrying out a method in accordance with any of the embodiments of the invention described herein. Thus, in accordance with another aspect of the invention there is provided a probe data management system, comprising: a processing device; and a first data store, the processing device being arranged to:

receive substantially real-time position information indicative of a geographical position of a probe device and device identification information identifying the probe device;

assign probe identification information to the position information, the probe identification information identifying a source of the position information within a probe data management system; and temporarily store an association between the device identification information and the assigned probe identification information in the first data store, wherein the stored association between the device identification information and the probe identification information is removed if no position information is received from the probe device for a predetermined time period.

It will be appreciated that any feature described by reference to this further aspect of the invention may equally be applied to embodiments in accordance with the above described aspects of the invention and vice versa. Similarly, the system of the present invention may comprise means for carrying out any of the steps of the method described above. The means for carrying out any of the steps of the method may comprise a set of one or more processors configured, e.g. programmed, for doing so. A given step may be carried out using the same or a different set of processors to any other step. Any given step may be carried out using a combination of sets of processors. The system may further comprise data storage means, such as computer memory, for storing identification information and/or position information. The methods of the present invention are, in preferred embodiments, implemented by a server. Thus, in embodiments, the system of the present invention comprises a server comprising the means for carrying out the various steps described, and the method steps described herein are carried out by a server.

In embodiments, the processing device is arranged, upon receipt of position information from a probe device, to determine if there is a stored association between device identification information identifying the probe device and probe identification information. The processing device may further be arranged, when a stored association is determined to exist, to retrieve the stored probe identification information and assign the retrieved probe identification information to the position information.

The predetermined time period after which the association is removed if no position information is received from the probe device may be between 1 and 30 minutes, preferably between 10 and 20 minutes, and most preferably 15 minutes.

In embodiments, the processing device is arranged to generate a probe object comprising: the probe identification information; and the position information associated with the probe identification information, and communicating the probe object to one or more other processing devices.

In embodiments, the system comprises: a further processing device; and a second data store, the further processing device being arranged to receive a plurality of probe objects and to temporarily store the probe objects in the second data store. The further processing device may be arranged to periodically extract probe objects from the second data store, and to use the position information from probe objects having the same probe identification information to create a historic journey trace for storage in a third data store.

As will be appreciated, in such embodiments, when a probe object is extracted from the data store it is preferably deleted from the data store. Accordingly, a probe object is preferably stored in the data store for at most a predetermined time period, preferably between 12 and 48 hours, and most preferably for 24 hours. The predetermined time period for which the probe object is at most stored is therefore preferably greater, and typically substantially greater, than the predetermined time period after which the association between the device identification information and the probe identification information is removed if no position information is received from the probe device.

According to a further aspect of the invention there is provided a probe data management system, comprising: a processing device; a first data store; and a second data store, the processing device being arranged to:

receive a plurality of probe objects, each probe object comprising substantially real-time position information indicative of a geographical position of a probe device and probe identification information identifying a source of the position information within a probe data management system; and temporarily store the received probe objects in the first data store, the processing device further being arranged to:

periodically extract probe objects from the first data store;

use the position information from probe objects having the same probe identification information to create a historic journey trace; and store the created historic journey traces in the second data store.

It will be appreciated that the methods in accordance with the present invention may be implemented at least partially using software. It will this be seen that, when viewed from further aspects, the present invention extends to a computer program product, i.e. computer software, comprising computer readable instructions adapted to carry out any or all of the method described herein when executed on suitable data processing means. The invention also extends to a computer software carrier comprising such software. Such a software carrier could be a physical (or non-transitory) storage medium or could be a signal such as an electronic signal over wires, an optical signal or a radio signal such as to a satellite or the like.

The present invention in accordance with any of its further aspects or embodiments may include any of the features described in reference to other aspects or embodiments of the invention to the extent it is not mutually inconsistent therewith.

Advantages of these embodiments are set out hereafter, and further details and features of each of these embodiments are defined in the accompanying dependent claims and elsewhere in the following detailed description.

BRIEF DESCRIPTION OF THE DRAWINGS

Embodiments of the invention will now be described by way of example only, with reference to the accompanying figures, in which.

DETAILED DESCRIPTION OF EMBODIMENTS OF THE INVENTION

Figure 1A:
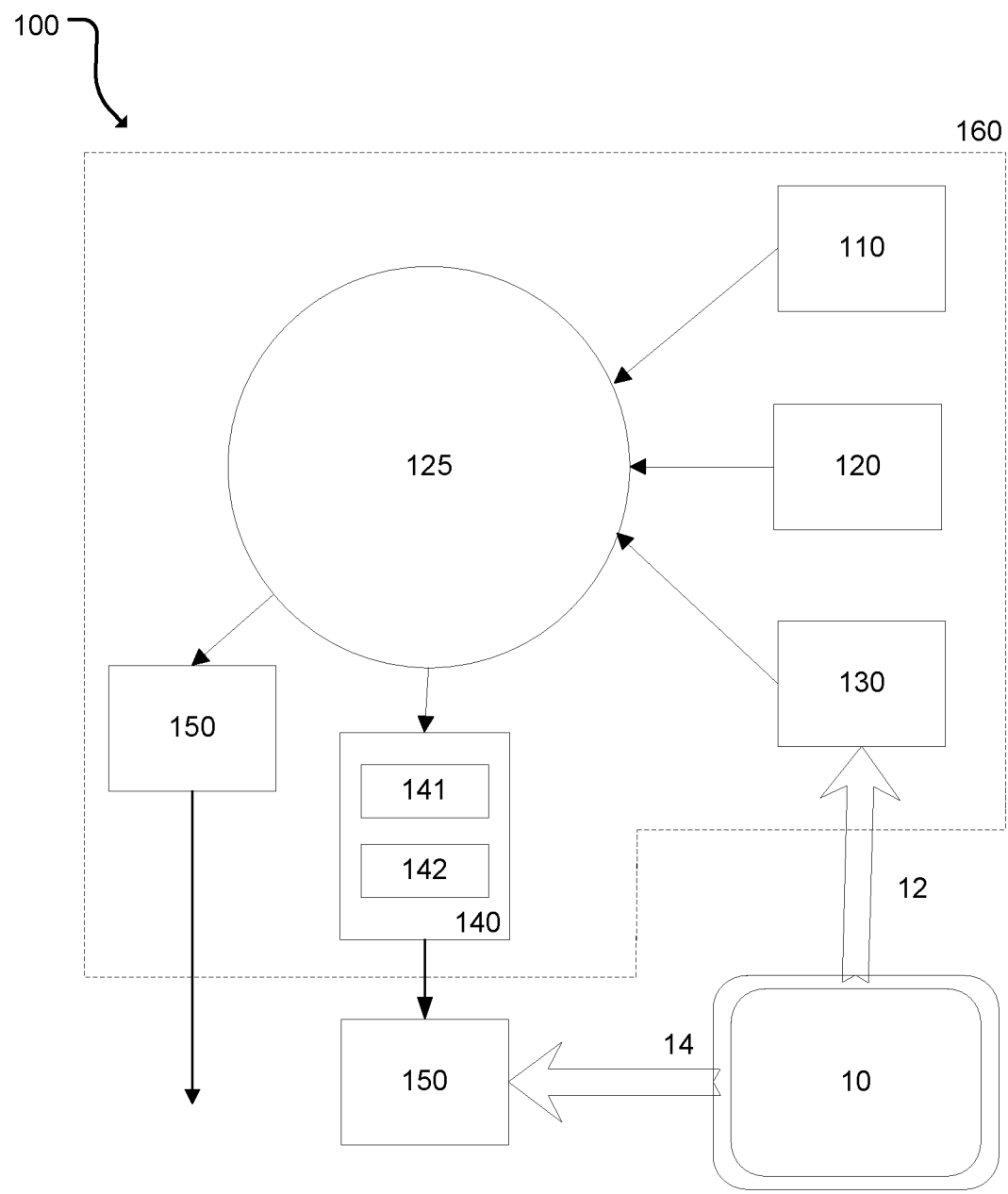
FIG. 1A shows a probe data management system according to an embodiment of the invention.

Embodiments of the present invention provide a method and system for managing probe data in an anonymous manner.

A probe device is a device for which a geographic position is capable of being determined and position information indicative of the geographical position communicated to a receiver system. The geographic position may be determined by the device itself or via a network to which the device is communicably coupled, such as a mobile telephone network.

The probe device may determine its geographic location with reference to received wireless signals, such as global navigation satellite system (GNSS) signals; an example of which is Global Positioning System (GPS). Probe devices of this type include an antenna, e.g. GPS antenna, by means of which satellite-broadcast signals, including location data, can be received and subsequently processed to determine a current location of the probe device. However it will be understood that embodiments of the invention are not limited to the use of GNSS. The probe device may alternatively or additionally use other types of received signals such as wireless network signals, for example Wi-Fi, to determine its geographic location.

The probe device may be a navigation device which is understood to mean any type of mobile processing device that is configured to execute navigation software so as to provide navigation functionality. It follows therefore that in the context of the present application, a navigation device is intended to include (without limitation) any type of mobile route planning and navigation device, irrespective of whether that device is embodied as a portable navigation device (PND), a navigation device built into a vehicle, or a mobile telephone, smartphone, tablet computer or portable digital assistant (PDA) executing navigation software. Some types of navigation device provide route planning functionality allowing a user to plan a route to a destination location, although embodiments of the invention are not limited in this respect.

Other types of probe device may be a vehicle management or monitoring device, or a vehicle tracking device. Such devices may be built into or attached to a vehicle, for example a commercial vehicle, to allow remote monitoring of the vehicle's location either as part of a fleet management system or for security purposes. Such devices may not be arranged to receive user interaction, i.e. from a driver of the vehicle. A probe device may also be a device which is not specifically intended for providing navigation or vehicle monitoring functionality. For example a mobile phone may be used as a probe device by determining a position of the mobile phone to within a network cell or more accurately by triangulation. Thus the position information may not be received from the probe device itself, but may be determined by a device or system with which the device interacts.

In one embodiment, the probe device is arranged to communicate, substantially in real time, position information to a receiver computer system. The probe data may be arranged to communicate other information, such as temporal information indicative of the time at a which the device was at a location; the position information therefore preferably comprise one or more time-stamped positions. The other information may additionally or alternatively comprise velocity information indicative of the velocity or speed of the device at a or each position.

The probe device may be arranged to store information indicative of its location at a first periodic interval, such as every 10 seconds, although it will be realised that this is an exemplary interval. The location may be stored in a memory of the probe device. Furthermore, it will be realised that the probe device may determine its location at more regular intervals, or on a substantially continuous basis. The probe device is arranged to communicate, at a second periodic interval, the position information to the receiver system. The second periodic interval may be 1 minute although it will be realised that this is an exemplary interval. Upon expiry of the second periodic interval a message may be communicated via a telecommunications network from the probe device to the receiver computer system which contains position information indicative of the geographic position of the probe device at each of the first time intervals. If the device is not communicably coupled to the telecommunications network upon expiry of the second time interval then the position information may be stored for communication at a later time when communication is possible. Therefore, in this illustrative embodiment, the message comprises six items of position information indicative of the probe device's location. The message further comprises device identification information which preferably uniquely identifies the probe device. The device identification may be a device identifier stored in the device upon manufacture or software installation, for example.

FIG. 1A illustrates a system 100 according to an embodiment of the invention. The system comprises one or more publisher modules 110, 120, 130 communicably coupled with a switching network 125 to which one or more subscribers 140, 150 are communicably coupled.

The one or more publishers modules 110, 120, 130 are each responsible for receiving probe data from a respective source of probe data; the modules being arranged to "publish" or pass information to the switching network 125. For example, one source of probe data may be third party sources, e.g. where the probe data is representative of the movements of mobile telecommunication devices. Such probe data is received at an associated publisher module 110. Another source of probe data may be a fleet management system which provides probe data from a plurality of tracking devices mounted upon each vehicle of a commercial fleet. The probe data is received at an associated publisher module 120. Another source of probe data is from navigation devices; the probe data from each of a plurality of navigation devices may be received by a respective publisher module 130 (as will be discussed in more detail below).

Each publisher module 110, 120, 130 is preferably arranged to receive the probe data from probe devices of a respective category or type. Whilst FIG. 1A illustrates three publisher modules 110, 120, 130, it will be realised that there may be fewer or more than three publisher modules 110, 120, 130. Furthermore the source of the probe data is not restricted to those types discussed above.

FIG. 1A illustrates a navigation device 10 which is communicably coupled, at least periodically, with one of the publisher modules 130 via a first communications medium 12. The first communication medium (or network) 12 may be a wireless telecommunications medium such as GPRS, 3G/UMTS, 4G/LTE, etc. Whilst embodiments of the invention will be explained with reference to the navigation device 10 it will be noted, as discussed, above, that the probe device is not limited in this respect.

The navigation device 10 is associated with device identification information which identifies the navigation device 10. The device identification information may uniquely identify the navigation device 10, at least within the population of navigation devices, i.e. the device identification information may not be globally unique such as a MAC address. For example the device identification information may be installed in the device 10 by a manufacturer. The device identification information may be permanently associated with the navigation device 10, or may be semi-permanently associated with the navigation device, such as an account name of the user of the navigation device 10.

The navigation device 10 may be indirectly communicatively coupled to the respective publisher; publisher 120 in the example of FIG. 1A. The navigation device 10 may communicate with an intermediary module (not shown), such as a module aggregating data from a number of navigation devices 10. The intermediary module may allocate an internal identification to data received from the navigation device. For example, in one embodiment the navigation device 10 is associated with a device identifier, and the intermediary module assigns the internal identifier to communications from the navigation device 10 using a cryptographic hash function based on the device identifier and a random component which is mutated on a periodic basis, such as every 12 hours. It will also be realised that the intermediary component may not be included within all systems.

The publisher module 120, 130 receives position information from the navigation device 10, either directly (for publisher 130), indirectly via the intermediary component (for publisher 120), or indirectly via a third party (for published 110). As described previously, the position information may be received in the form of a message comprising device identification information identifying the navigation device 10 and one or more items of position information each identifying a geographic location at a respective time. The device identification information may be the device identifier or the internal identifier assigned by the intermediary component.

The message may further comprise time information identifying a time at which the navigation device 10 was present at one or more of the geographic locations. For example, the message may include time information relating to a first geographic location identified within the message, the time associated with the further geographic locations each having a known temporal offset, such as 10 seconds, from the first geographic location. Alternatively, time information may accompany each item of position information denoting a time at which the navigation device 10 was present at that location. For example, the message may comprise one or a plurality of position reports of the form (time, latitude, longitude). The message may be received in substantially real time, e.g. allowing for communication delays from the navigation device 10 to the publisher.

The device identification information may relate to the navigation device 10, e.g. a device ID, an account associated with the device, e.g. a username, or an identifier based on the device ID.

Accordingly, in summary, the or each publisher module 110, 120, 130 receives and decodes messages, and injects them into the switching network 125 (also referred to as a switching fabric). The received messages, at least when received from devices 10, comprise device identification information, e.g. a device identifier or an identifier generated from a device identifier, and one or more time-stamped positions (e.g. time, latitude, longitude). Typically a set of time-stamped positions will be received at one time; although this is dependent on the report rate of the device (i.e. the frequency at which data is passed from the device to the publisher) and the collection rate of the device (i.e. the frequency at which the location of the device is determined). A different publisher is typically required for each source due to, for example, the number of devices associated with the source, the manner of obtaining the source data, the reporting frequency, etc.

Figure 1B:
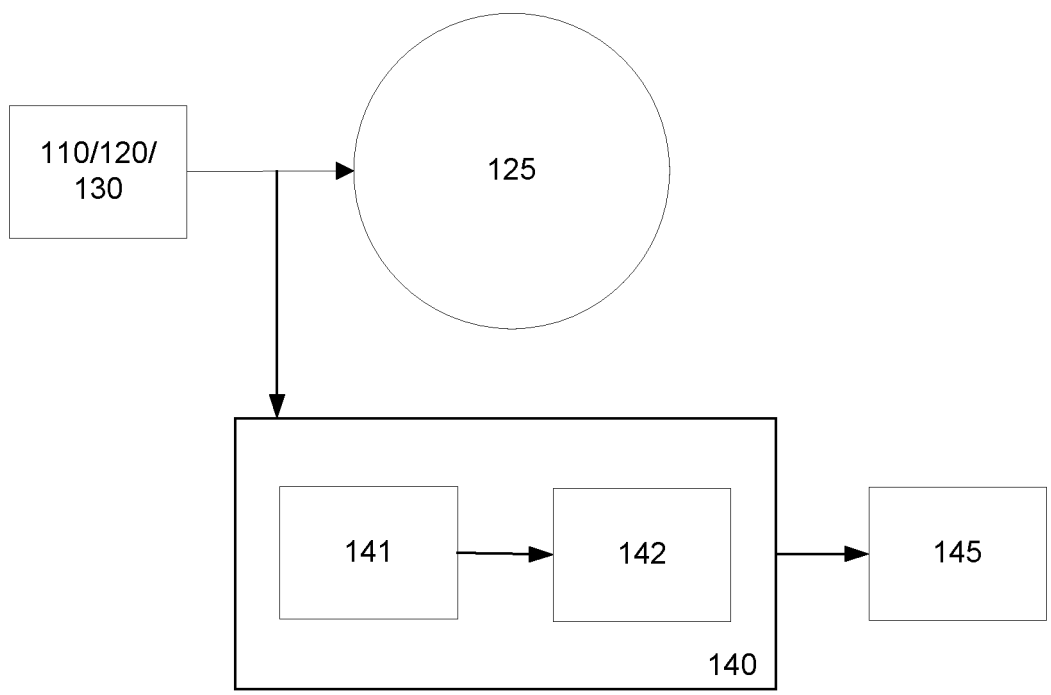
FIG. 1B shows an alternative arrangement of a portion of the system of FIG. 1A.

The position information is communicated within the PDM system 100 in association with probe identification information (or referred to herein as "probe identifier"). The probe identification information identifies the probe device as an origin of information only within the PDM system 100, i.e. without reference to the device identification information, e.g. device identifier or internal identifier. The position information from the received message may be communicated within the PDM system 100 by stripping or removing the device identification information from the received message and attaching a probe identifier to the message before onward transmission from the publisher module 110, 120, 130 to the switching network 125 (or another component of the system as depicted in FIG. 1B).

A probe object having various properties may be instantiated by the publisher module 110, 120, 130. The probe object may represent the one or more geographic positions of the probe device. For example the probe object may have attributes of: probe identifier; time; and position (e.g. latitude and longitude). Each probe object may contain information indicative of more than one location of the probe device, such as the plurality of locations received in the message from the probe device. The publisher module 110, 120, 130 upon instantiation of the probe object, assigns a determined probe identifier and attributes (e.g. position, time, etc) based on the received data to the probe object. The probe object is then communicated from the publisher module to the switching network 125.

The probe identification information (or probe identifier), is used to associate position information from the same probe device, such as the navigation device 10, and to distinguish the position information from that received from other sources of position information, such as other navigation devices, but in an anonymous manner. The probe identifier identifies the source of the position information only within the PDM system 100, i.e. within the boundary 160; and thus is used to anonymise the probe data within the PDM system 100 by breaking the link between the position information in the probe object and the device identification information.

The probe identifer may be based upon an identity of the publisher module 110, 120, 130 receiving the message. For example, each publisher module may have an associated, unique, identification such as a publisher identifier. The publisher identifier may be generated when the publisher module is created, such as based on a random number. The publisher identifier may be maintained for as long as the publisher module exists. In one embodiment, a first portion of the probe identifier may be based upon the publisher identifier, and a second portion of the probe identifier may be used to identify the probe device within the PDM system 100.

The probe identifier may be unique, at least on a per publisher basis. The probe identifier may be based upon a random number. For example, a first probe identifier may be generated by a particular publisher module based upon a random number when the first probe identifier is created by that publisher module. Thereafter, the probe identifier may be incremented when messages are received from further probe devices.

The or each publisher module 110, 120, 130 may retain, or have access to, a look table, e.g. in a local cache or other, preferably volatile, memory device, that maps device identification information to respective probe identifiers. An entry may be made in the lookup table when a new probe identifier is created, wherein the entry lists the associated probe identifier with the respective device identification information, e.g. device or internal identifier. The table entry may contain data indicative of a time that a last message was received from the probe device 10.

Figure 2:
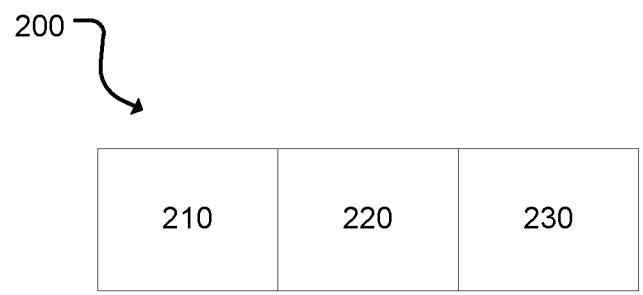
FIG. 2 shows an entry in a cache according to an embodiment of the invention.

FIG. 2 illustrates an exemplary table entry 200 according to an embodiment of the invention. The table entry 200 contains information 210 identifying a probe identifier used with the PDM system 100 to identify the source of the probe information; information 220 identifying the probe device 10 outside of the PDM system, such as the device identifier or internal identifier; and information 230 identifying the time information was last received from the probe device 10. The table entry may comprise further information to that shown in FIG. 2.

In embodiments of the invention, if a probe device is not communicative with the publisher module for a predetermined period of time, e.g. 15 minutes, then the association between the probe device and assigned probe identifier is removed. The data indicative of a time that a last message was received is preferably used to remove the link between the device identification information and probe identifier by deleting the relevant entry from the look-up table used by the publisher when the last message was received at a time more than the predetermined period of time. As will be appreciated, the predetermined period of time may be any value as desired, e.g. in order to meet the required legal privacy requirements of the country in which the system is based, or in which the devices from which data is collected are based. The predetermined period of time may, for example, be set within the software of the publisher module.

The switching network 125 is arranged to route probe objects (and thus the probe data contained therein) in the PDM 100 from publisher modules 110, 120, 130 to subscriber modules 140, 150; the subscriber modules take information from the switching network for storage or further processing. In the exemplary system 100 of FIG. 1 there is shown first and second subscriber modules 140, 150 although it will be realised that the system 100 may comprise one or more subscribers 140, 150. The switching network 125 may be based on a communication protocol such as User Datagram Protocol (UDP), although it will be realised that other communication protocols may be used. The communication protocol may support multicast to allow for multiple subscribers 140, 150 to receive each communication.

In the PDM system 100 shown in FIG. 1A, a first subscriber 140 is a historic subscriber which subscribes to probe information provided via the switching network 125 from the one or more publishers 110, 120, 130. The historic subscriber 140 is arranged to receive probe data in order to establish and maintain a database 145 of historic journey information. By historic journey information it is meant that the database content may be used to indicate journeys performed by a probe device, and the associated vehicle, at a previous time, e.g. at least from the previous day.

The PDM system 100 further comprises the second subscriber 150 which is a live subscriber. It will be understood that the term "live" encompasses the receipt of recent probe information, such as allowing for processing and communication delays in the PDM system 100. The live subscriber 150 receives probe information via the switching network 125 and may use the probe information, for example, to provide traffic information based on the location of probe devices, although it will be realised that other uses may be envisaged.

In many embodiments, the subscriber modules 140, 150 will be configured to operate from the egress of the switching network 125. It is also envisaged, however, and particularly in the case of the historic subscriber 140, that a subscriber module may be configured instead to operate from the ingress of the switching network 125. An example of such an arrangement is shown in FIG. 1B.

The historic subscriber 140 is arranged to receive the substantially real time probe information from the one or more publisher modules in order to supplement the database 145 of historic journey information. The historic subscriber 140 preferably comprises a temporary store 141 and a processing module 142. In operation, the historic subscriber 140 is arranged to store the probe objects published by the one or more publishers 110 in a database within the temporary store 141. A portion of such a database is illustrated by the table 300 in FIG. 3, wherein time and position information is shown for three sources of probe data having probe identifiers 10132, 45322 and 37654. As will be appreciated, the data stored in the temporary stored is identified by the probe identifier only, and without reference to the device identification information. Accordingly, it is not possible to determine the source of the stored probe objects from the data within the temporary store. The data in the temporary store 141 is designed to be short-lived; with the store preferably being regularly queried and cleared by the processing module 142. For example, the store 141 may be queried in a manner such that data remains in the store for no more than a predetermined period of time, e.g. 24 hours. This predetermined time is preferably longer, and typically substantially longer, than time period referred to above and in which the association between the device identification information and the probe identifier is broken. In one example, the processing module 142 may query the database 141 at the same time each day; in this example some data may therefore only be in the store for a very limited time if it was only added to the store shortly before the store is queried, but at most the data is in the store for 24 hours.

When the processing module 142 queries the store 141, all entries in the store having the same probe identifier are determined and combined to form one or more, and typically a plurality of, trace objects. Each trace object contains the time-stamped position information obtained from a particular probe device in the period of time since the temporary store 141 was last queried, and therefore represents a historic journey trace for the probe device. An example of a trace object is shown by the record 302 in FIG. 3; in this case the trace object is for the probe device having been assigned the probe identifier 10132. The one or more trace objects generated by the processing module 142 are stored in the database of historic journey information 145.

As will therefore be appreciated the probe identifier is therefore used to form each trace object, but is not associated with the trace object when it is stored in the database 145. In other words, once the trace objects are stored in the database 145, there is no associated information that identifies the source of the trace object; all that is known is that it relates to a journey made by a single probe device.

In some embodiments, and in order to further enhance data privacy, the subscriber 140 may be arranged to remove a start and/or end portion of a generated trace object; in this way it becomes difficult to precisely identify the start and end locations journey made by a probe device from the historic journey trace.

As shown in FIG. 1A, the database 145 may also be provided with historic journey information from a probe device, such as the navigation device 10, when the device 10 is communicably coupled to a server such as via a user's home computer or network. The server may be the server of a company associated with the navigation device 10. When so communicably coupled the navigation device 10 is arranged to transmit historic journey information to the server or directly to the database 145 for storage therein. That is, the historic journey information is not substantially real-time journey information indicative of a current or recent position of the navigation device 10. Again in such situations, the journey information is stored in the database 145 as one or more trace objects, as appropriate, without any associated information identifying the source of the trace object.

Figure 4:
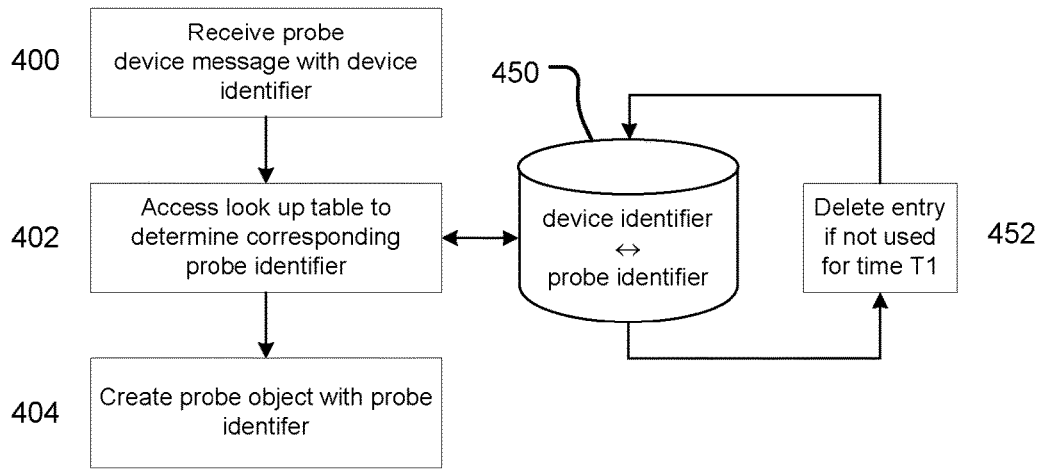
FIG. 4 shows a method of creating probe objects according to an embodiment of the invention.

FIG. 4 illustrates a method of creating probe objects according to an embodiment of the invention.

In step 400 a message is received, as described above, from a probe device, such as the navigation device 10, at a respective publisher 110, 120, 130. The message comprises device identification information, such a device identifier.

In step 402 a look up table 450 is accessed to determine corresponding probe identification information, such a probe identifier. The look up table 450 associates device identification information, e.g. a device identifier, with probe identification information, e.g. a probe identifier; however the look table is regularly cleaned, such that if data is not received from a probe device with a specific device identifier for a predetermined time T1, e.g. 15 minutes, then the association is removed from the look up table 450—step 452. If data is received from a probe device that does not have an associated probe identifier in the look up table 450, then a new probe identifier is created and an entry added to the table.

Finally, in step 404, a probe object is created for subsequent processing. The probe object includes the information from the received probe device message, e.g. one or more time-stamped locations, except the information is now linked to the probe identifier, rather than the device identifier.

Figure 5:
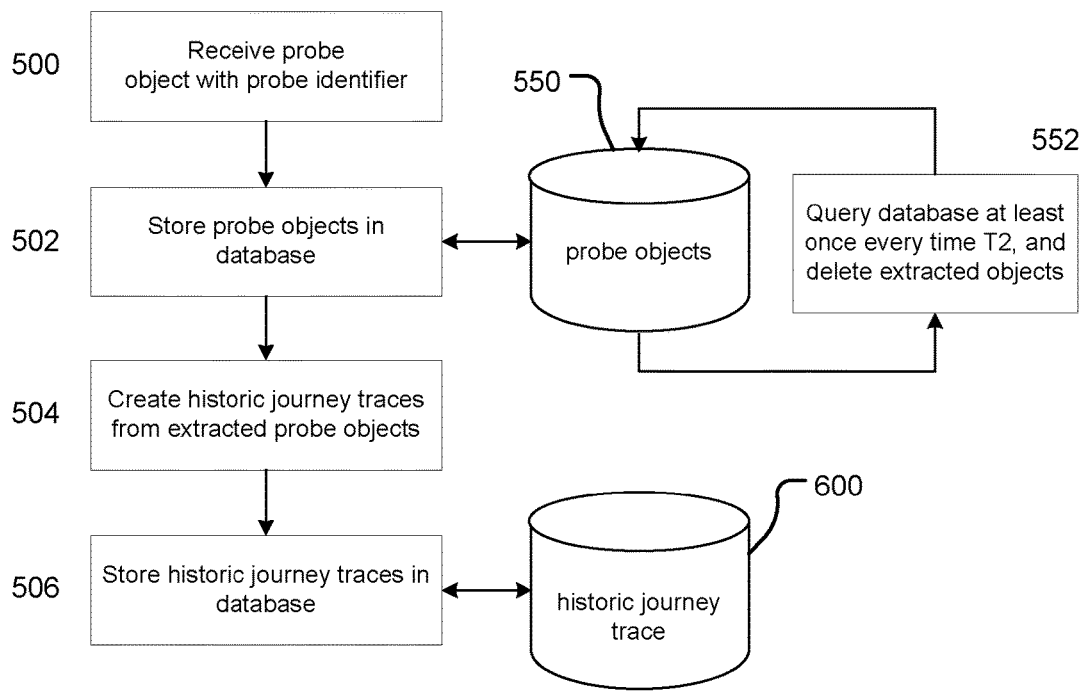
FIG. 5 shows a method of creating historic journey traces according to an embodiment of the invention.

FIG. 5 shows a method of creating historic journey traces from the created probe objects according to an embodiment of the invention.

In steps 500 and 502 probe objects are received and stored in a database 550. The probe objects are identifiable in the database 550 by their respective probe identifiers. The database 550 is queried at least once every time T2, e.g. 24 hours (step 552), and all the entries with the same probe identifier are grouped together to create a historic journey trace for the probe device represented by the probe identifier—step 504. Accordingly, it will be appreciated that entries only exist in the database 550 for at most the time T2 before they are extracted.

In step 506 the created historic journey traces are stored in a database 600. These historic journey traces are stored anonymously, i.e. without reference to a device identifier or probe identifier; all that is known is that the trace relates to a trip by a single probe device. The historic journey traces can therefore be stored for long periods of time, and can be shared with third parties without providing any information identifying the source of the data. These stored historic journey traces have many beneficial uses; for example in the creation, updating and/or refinement of digital maps.

Figure 3:
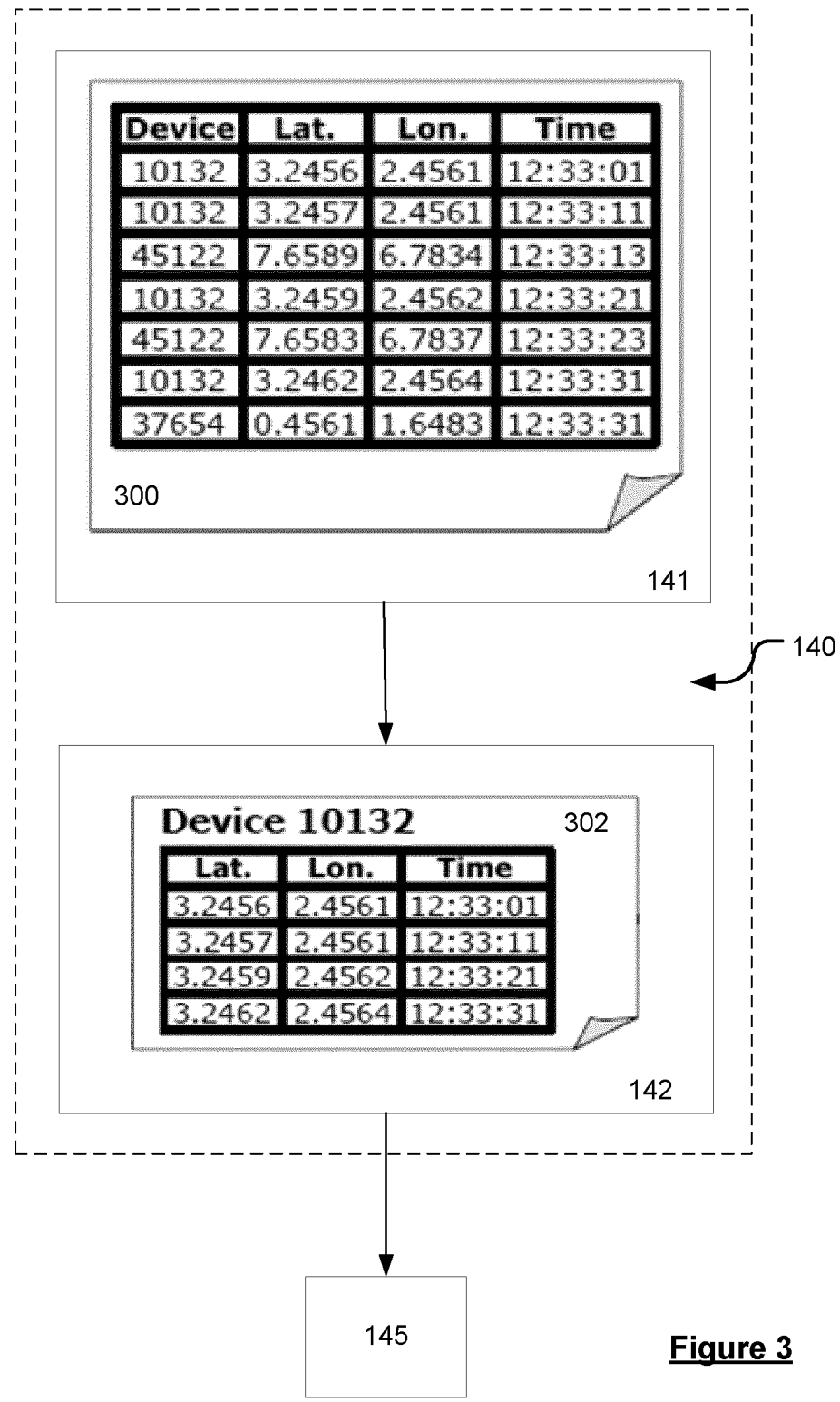
FIG. 3 shows an exemplary historic subscriber for use in the invention.

The historic journey traces can be stored, as show for example in FIG. 3, as a series of time-stamped positions. Alternatively, the time-stamped positions can be further processed, e.g. prior to storage, such the stored historic journey trace comprises data representing one or more curves indicative of the path travelled of the probe device. As will be appreciated, each trace indicates a geographic position of a mobile device against time, i.e. traces the path of the device. A location-aware mobile device, herein referred to simply as a mobile device, is any device capable of determining its geographic location from wirelessly received signals.

The stored historic journey traces may comprise probe traces as received from the mobile devices (often referred to as "uncoordinated" traces), refined probe traces (i.e. uncoordinated probe traces that have been subjected to one or more of the following: smoothing; adjusting the position of at least portions of the trace depending on the direction of traffic flow, filtering traces not associated with a type of the transportation network), one or more bundles each comprising a plurality of traces, or any combination thereof. Bundles of probe traces are formed from a plurality of individual probe traces, uncoordinated or refined, which traverse a path having the same beginning and end within a spatial threshold value and which do not deviate, in location, by more than a threshold from a reference probe trace (e.g. a probe trace passing through a densely populated area of probe traces). In other words, a probe trace bundle is a single probe trace that represents a plurality of individual probe traces.

Embodiments of the present invention therefore provide a probe data management (PDM) method and system which facilitates anonymity between a device providing probe data and the probe data. That is, within the PDM system information identifying the source of the probe data is not associated with information identifying the device external to the system.

It will be appreciated that embodiments of the present invention can be realised in the form of hardware, software or a combination of hardware and software. Any such software may be stored in the form of volatile or non-volatile storage such as, for example, a storage device like a ROM, whether erasable or rewritable or not, or in the form of memory such as, for example, RAM, memory chips, device or integrated circuits or on an optically or magnetically readable medium such as, for example, a CD, DVD, magnetic disk or magnetic tape. It will be appreciated that the storage devices and storage media are embodiments of machine-readable storage that are suitable for storing a program or programs that, when executed, implement embodiments of the present invention. Accordingly, embodiments provide a program comprising code for implementing a system or method as discussed above, and a machine readable storage storing such a program. Still further, embodiments of the present invention may be conveyed electronically via any medium such as a communication signal carried over a wired or wireless connection and embodiments suitably encompass the same.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings), may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of any foregoing embodiments. The invention extends to any novel one, or any novel combination, of the features disclosed in this specification (including any accompanying claims, abstract and drawings), or to any novel one, or any novel combination, of the steps of any method or process so disclosed. The claims should not be construed to cover merely the foregoing embodiments, but also any embodiments which fall within the scope of the claims.

The invention claimed is:

1. A computer implemented method for probe data management, comprising:
   receiving substantially real-time position information indicative of a geographical position of a probe device and device identification information specifically identifying the probe device;
   assigning probe identification information to the position information, wherein the probe identification information is an internal identifier for the probe data management system that identifies a source of the position information within a probe data management system, and wherein the assigning comprises replacing the device information specifically identifying the probe device with the probe identification information, thereby configuring the position information to be used in subsequent operations without revealing the device information specifically identifying the probe device;
   temporarily storing, in an entry in a data store, an association between the device identification information and the assigned probe identification information; and
   removing, from the data store, the stored association between the device identification information and the probe identification information when no position information is received from the probe device for a predetermined time period.

2. The method of claim 1, comprising, upon receipt of position information from a probe device, determining if there is a stored association between device identification information identifying the probe device and probe identification information.

3. The method of claim 2, comprising, when a stored association is determined to exist, retrieving the stored probe identification information and assigning the retrieved probe identification information to the position information.

4. The method of claim 1, wherein the data store is accessible to a processing device arranged to receive the position information from the probe device.

5. The method of claim 1, wherein the predetermined time period after which the association is removed if no position information is received from the probe device is between 1 and 30 minutes.

6. The method of claim 1, comprising generating a probe object comprising: the probe identification information; and the position information associated with the probe identification information, and communicating the probe object to one or more processing devices for further processing.

7. The method of claim 6, comprising receiving a plurality of probe objects, and temporarily storing the probe objects in the data store.

8. The method of claim 7, comprising periodically extracting probe objects from the data store, and using the position information from probe objects having the same probe identification information to create a historic journey trace for storage in a trace data store.

9. A computer implemented method for probe data management, comprising:
   receiving a plurality of probe objects, each probe object comprising substantially real-time position information indicative of a geographical position of a probe device and probe identification information identifying a source of the position information within a probe data management system, wherein the probe data management system comprises a record of an association between each piece of probe identification information and device identification information that specifically identifies the probe device that was the source of corresponding received real-time position information, and wherein the probe identification information was previously assigned to the position information in replacement of device information specifically identifying the probe device, thereby configuring the position information to be used in subsequent operations without revealing the device information specifically identifying the probe device;
   temporarily storing the received probe objects in a data store;
   periodically extracting probe objects from the data store; and
   using the position information from probe objects having the same probe identification information to create a historic journey trace.

10. The method of claim 7, wherein a probe object is stored in the data store for at most a predetermined time period.

11. The method of claim 10, wherein the predetermined time period for which the probe object is at most stored is greater than the predetermined time period after which the record of the association between the device identification information and the probe identification information is removed if no position information is received from the probe device.

12. A probe data management system, comprising: a processing device; and a first data store, the processing device being arranged to:
   receive substantially real-time position information indicative of a geographical position of a probe device and device identification information specifically identifying the probe device;
   assign probe identification information to the position information, wherein the probe identification information is an internal identifier for the probe data management system that identifies a source of the position information within the probe data management system, and wherein the assigning comprises replacing the device information specifically identifying the probe device with the probe identification information, thereby configuring the position information to be used in subsequent operations without revealing the device information specifically identifying the probe device;
   temporarily store, in an entry in the first data store, an association between the device identification information and the assigned probe identification information; and
   remove, from the first data store, the stored association between the device identification information and the probe identification information when no position information is received from the probe device for a predetermined time period.

13. The system of claim 12, wherein the processing device is arranged, upon receipt of position information from a probe device, to determine if there is a stored association between device identification information identifying the probe device and probe identification information.

14. The system of claim 13, wherein the processing device is arranged, when a stored association is determined to exist, to retrieve the stored probe identification information and assign the retrieved probe identification information to the position information.

15. A non-transitory computer readable medium comprising instructions which, when executed by at least one processor of a system, cause the system to operate according to the method of claim 1.

16. The method of claim 7, wherein a probe object is stored in the data store for at most between 12 and 48 hours.

17. The method of claim 9, wherein a probe object is stored in the data store for at most a predetermined time period.

18. The method of claim 17, wherein the predetermined time period for which the probe object is at most stored is greater than the predetermined time period after which the association between the device identification information and the probe identification information is removed if no position information is received from the probe device.

19. The method of claim 9, wherein a probe object is stored in the data store for at most between 12 and 48 hours.

20. A non-transitory computer readable medium comprising instructions which, when executed by at least one processor of a system, cause the system to operate according to the method of claim 9.

* * * * *